United States Patent [19]

Islam et al.

[11] Patent Number: 6,058,054
[45] Date of Patent: May 2, 2000

[54] METHOD AND SYSTEM FOR PROVIDING AN INSTANT BACKUP IN A RAID DATA STORAGE SYSTEM

[75] Inventors: Shah Mohammed Rezaul Islam, Cary; Vikram Harakere Krishnamurthy, Durham; Philip Anthony Richardson, Apex, all of N.C.; Prasenjit Sarkar, San Jose, Calif.

[73] Assignee: International Business Machines Corporation, Armonk, N.Y.

[21] Appl. No.: 09/281,561

[22] Filed: Mar. 31, 1999

[51] Int. Cl.$^7$ ...................................................... G11C 7/00
[52] U.S. Cl. .......................... 365/200; 395/180; 395/181; 395/182.04; 395/182.07
[58] Field of Search ....................... 365/200; 395/182.04, 395/180, 181, 182.07

[56] References Cited

U.S. PATENT DOCUMENTS

| | | | |
|---|---|---|---|
| 5,124,987 | 6/1992 | Milligan et al. | 371/10.1 |
| 5,303,244 | 4/1994 | Watson | 371/10.1 |
| 5,548,711 | 8/1996 | Brant et al. | 395/182.03 |
| 5,650,969 | 7/1997 | Niijima et al. | 365/200 |
| 5,742,792 | 4/1998 | Yanai et al. | 395/489 |
| 5,889,795 | 3/1999 | Niijima et al. | 371/40.4 |

*Primary Examiner*—David Nelms
*Assistant Examiner*—Hien Nguyen
*Attorney, Agent, or Firm*—Joseph A. Sawyer

[57] ABSTRACT

A method and system for providing a backup of a portion of a source drive of a plurality of drives in a redundant array of inexpensive disks (RAID) data storage system is disclosed. The portion of the source includes a plurality of segments. The method and system include associating the source drive with a target drive of the plurality of drives and providing a copy of the plurality of segments on the target drive. The copy is provided such that input to and output from source drive and the target drive are allowed during the step of providing the copy of the plurality of segments.

12 Claims, 9 Drawing Sheets

METHOD AND SYSTEM FOR PROVIDING AN INSTANT BACKUP IN A RAID DATA STORAGE SYSTEM

CROSS REFERENCE TO RELATED APPLICATIONS

The present application is related to co-pending U.S. patent application Ser. No. 09/282,715 filed on Mar. 31, 1999 (RP999054/1291P) and assigned to the assignee of the present application.

FIELD OF THE INVENTION

The present invention relates to data storage systems and more particularly to a method and system for providing an instant backup of a portion of a RAID (redundant array of inexpensive disks) data storage system.

BACKGROUND OF THE INVENTION

In order to store data, some computer systems use a redundant array of inexpensive disks ("RAID") data storage subsystem. For example, a RAID subsystem may be coupled with a host or server that services clients on a network. The RAID subsystem typically includes a controller and a plurality of disk drives. The controller generally controls operations of the RAID subsystem. Information is physically stored on the drives.

It may be desirable to copy the information stored on the RAID subsystem and which is being used via the host. For example, the data stored on one or more of the drives may be backed up to ensure the data is available in the case that the RAID subsystem malfunctions. The drive from which the backup is desired is known as the source drive. In order to copy a portion of the data stored on the source drive of the RAID subsystem, the files on the source drive that are desired to be copied are closed. Thus, no input to or output from the files on the source drive is allowed during copying. This ensures that the data on the source drive does not change during the copying procedure. The desired files on the source drive are then copied progressively to another location. This location may be another drive, called a target drive. Typically, the organization of the source drive is also copied. Thus, the target drive may include directories and subdirectories containing copied files. The copies on the target drive can then be accessed separately from the originals on the source drive. The drive being copied is then released, allowing input to and output from the files.

Although the conventional method for providing a copy functions, it may take a long time to copy the files from the source drive to the target drive. This is particularly true where there is a great deal of data to be copied, for example for back up. During the conventional copying procedure, the source drive cannot be accessed via the host. Thus, users of the system may be precluded from reading, modifying, or otherwise utilizing the data to be copied for a relatively long time.

Accordingly, what is needed is a system and method for more rapidly generating a copy of data on a RAID subsystem. It would also be desirable if the method and system for generating the copy had a relatively low impact on system performance. The present invention addresses such a need.

SUMMARY OF THE INVENTION

The present invention provides a method and system for providing a backup of a portion of a source drive of a plurality of drives in a redundant array of inexpensive disks (RAID) data storage system. The portion of the source includes a plurality of segments. The method and system comprise associating the source drive with a target drive of the plurality of drives and providing a copy of the plurality of segments on the target drive. The copy is provided such that input to and output from source drive and the target drive are allowed during the step of providing the copy of the plurality of segments.

According to the system and method disclosed herein, the present invention allows users to read from or write to the source drive or target drive during copying. Thus, to the user, the copying procedure appears relatively instantaneous.

DETAILED DESCRIPTION OF THE INVENTION

The present invention relates to an improvement in a redundant array of inexpensive disks ("RAID") data storage subsystem. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
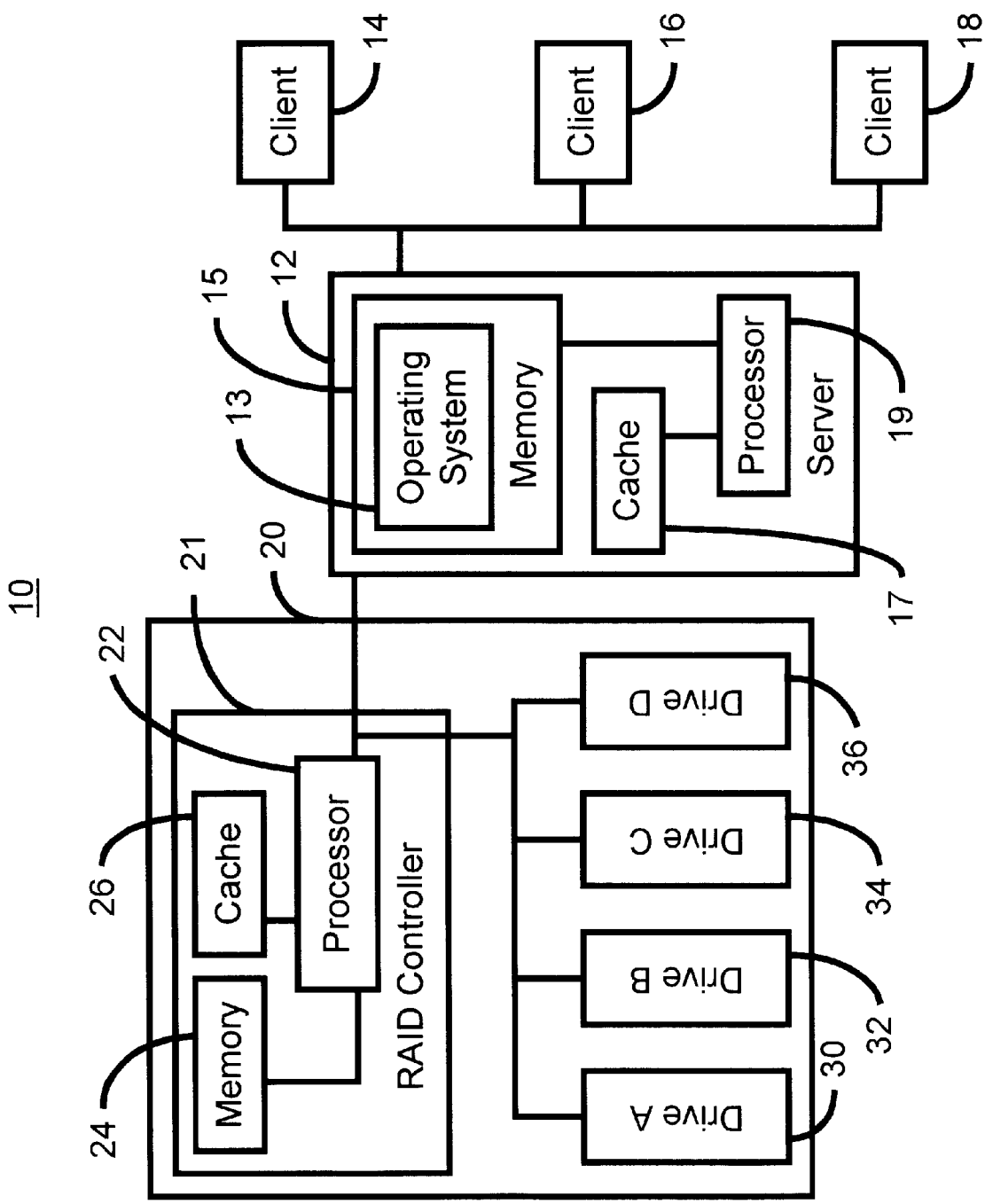
FIG. 1 is a block diagram of a system including a RAID data subsystem.

FIG. 1 is a block diagram of a network 10 in which a RAID subsystem 20 is used for data storage. For clarity, only some features of the system 10 and the RAID subsystem 20 are depicted. The computer system 10 includes a server 12 that services network clients 14, 16, and 18. The server 12 includes an operating system 13, for managing the server 12, residing on a memory 15. The server 12 also includes a cache 17 for rapid access to data and a processor 19 for running the operating system 13, running other applications (not shown), and performing other operations. The RAID subsystem 20 includes a RAID controller 21, and disk drives 30, 32, 34, and 36. Although four drives 30, 32, 34 and 36 are depicted, nothing prevents the use of another number of drives. Typically, bytes or groups of bytes are striped across the drives 30, 32, 34, and 36. The RAID controller 21 includes processor 22, a memory 24, and a RAID cache 26. The memory 24 may include a nonvolatile memory that stores program instructions for operating the RAID controller 21. When the client 14, 16, or 18 desires to use data stored by one of the drives 30, 32, 34, or 36 in the RAID subsystem 20, a portion of the data may be retrieved into the cache 17. A user operating one of the clients 14, 16, or 18 may then modify or read the data stored in the cache 17.

Using the RAID subsystem 20, a great deal of data for the system 10 can be stored relatively inexpensively. Striping data across the drives 30, 32, 34, and 36 improves performance, allowing data to be accessed more rapidly. Furthermore, fault tolerance can be achieved using RAID 1, RAID 2, RAID 3, RAID 4, RAID 5, RAID 6, or RAID 10. Thus, the RAID subsystem 20 is useful.

Figure 2:
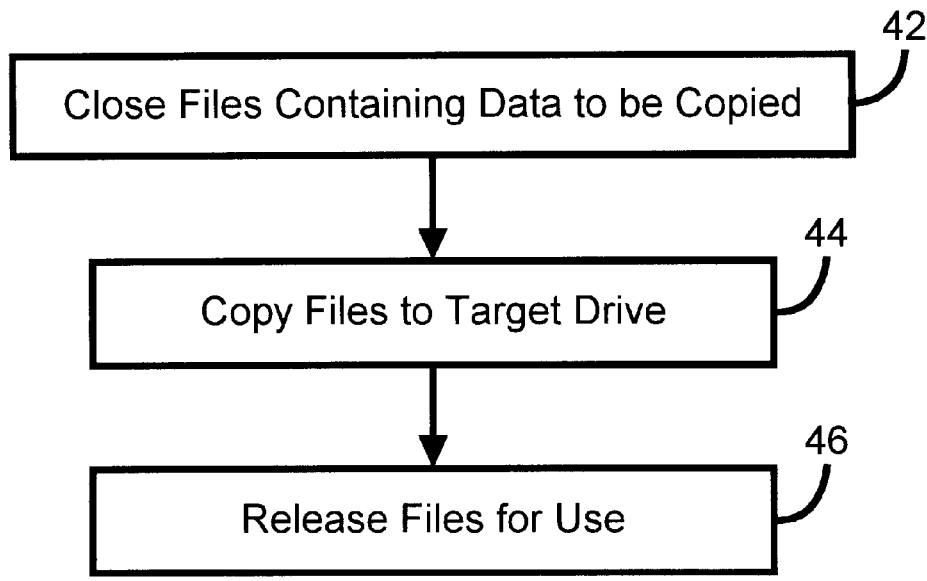
FIG. 2 is a flow chart of a conventional method for copying data from a disk drive in the RAID data subsystem.

It may be desirable to make a copy of the data stored by the RAID subsystem 20. For example, it may be desirable to back up data stored by the RAID subsystem 20. FIG. 2 depicts a conventional method 40 for providing a copy of data stored on the RAID subsystem 20. The files to be copied on the source drive are closed, via step 42. For example, data on the drive A 30 is to be copied, the files on drive A holding the data are closed in step 42. Thus, blocks of data stored on the isolated source drive cannot be read from or written to. This allows a consistent picture of the data to be maintained during copying. A portion of the source drive is then copied, via step 44. When copying is completed, the blocks of data on the source drive and, therefore, the files being copied are released for use, via step 46. Thus, the data on the source drive can be modified or read once copying is complete. A copy of a portion of the source drive or the entire source drive may thus be provided.

Although the conventional shown in FIG. 2 functions, one of ordinary skill in the art will readily realize that the server 12 is precluded from accessing files being copied from the source drive during copying. In many systems, a great deal of data is desired to be copied. For example, the entire drive may be backed up or the file being copied may be a very large database. When such data is copied, the files may be closed for a relatively long period of time. During this time the server 12 cannot access the files. Thus, a user cannot read from or write to the source drive during the copying. However, users of the network 10 may frequently wish to use data stored in the file. For example, if the file being copied is a large database accessed frequently using one or more of the clients 14, 16, or 18 and the server 12, many users may desire access to this file during copying. Refusing to permit access to this data during copying impedes the ability of the server 12 to provide the clients 14, 16, and 18 with the desired information.

The present invention provides a method and system for providing a backup of a portion of a source drive of a plurality of drives in a redundant array of inexpensive disks (RAID) data storage system. The portion of the source includes a plurality of segments. The method and system comprise associating the source drive with a target drive of the plurality of drives and providing a copy of the plurality of segments on the target drive. The copy is provided such that input to and output from source drive and the target drive are allowed during the step of providing the copy of the plurality of segments.

The present invention will be described in terms of a network employing specific elements. However, one of ordinary skill in the art will readily recognize that this method and system will operate effectively in other systems having different components and environments other than networks. The present invention will also be described in the context of providing a backup. However, the present invention could be used to provide a copy for other purposes. Furthermore, the present invention could provide a copy of all or a portion of a drive or to provide a copy of multiple drives.

Figure 3:
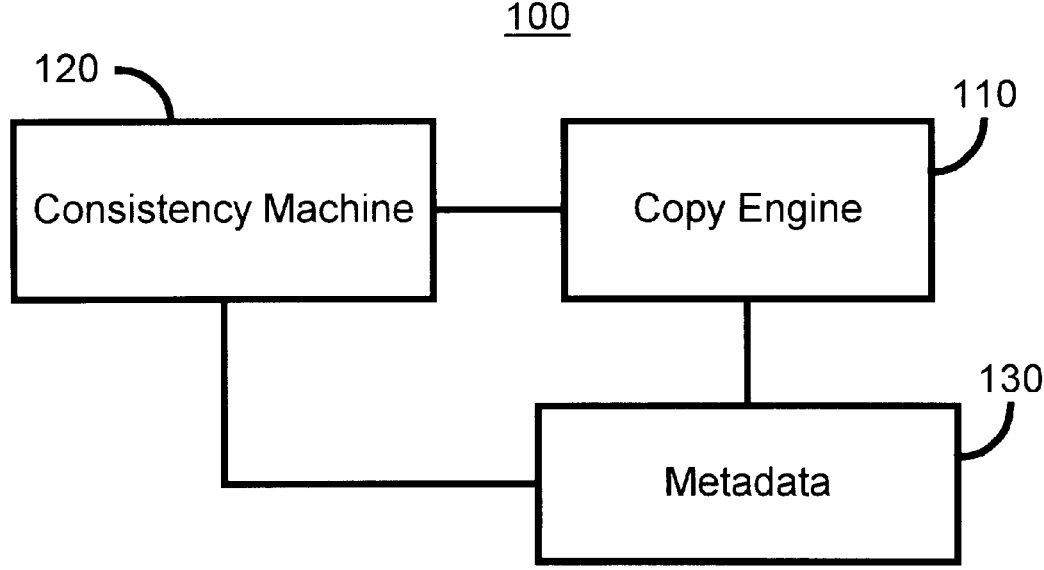
FIG. 3 is a block diagram of a system in accordance with the present invention for rapidly providing a copy of data in a RAID subsystem.

To more particularly illustrate the method and system in accordance with the present invention, refer now to FIG. 3, depicting one embodiment of a system 100 used in rapidly providing a copy of data. The method and system in accordance with the present invention can be used in conjunction with a system using a RAID subsystem, such as the network 10 and the RAID subsystem 20. The system 100 includes a copy engine 110 coupled with a consistency machine 120, and metadata 130. The copy engine 110, consistency machine 120, and metadata 130 preferably reside on the RAID controller 21. For example, the metadata 130 preferably resides in the nonvolatile memory 24 of the RAID controller 21. The copy engine 110 copies the desired data in the background. Virtually instantaneously after copying is initiated, the files being copied can be accessed using the server 12. Thus, while the copy of the data is being provided by the copy engine 110, the files being copied can be accessed for use. The consistency machine 120 ensures that data can be written to or read from the files being copied without adversely affecting the copying process or use of the data. The metadata 130 is used to track changes in the data being copied.

Figure 4:
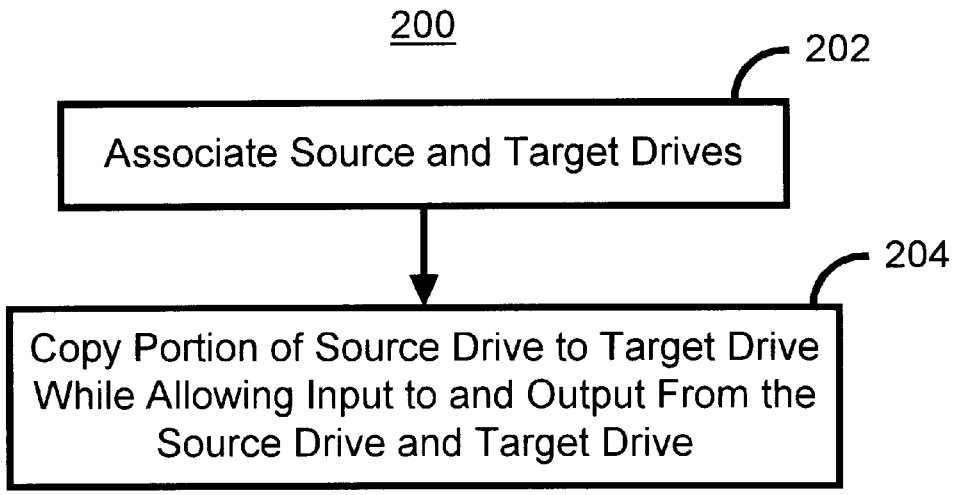
FIG. 4 is a high-level flow chart of a method for rapidly providing a copy of data residing on a drive in a RAID subsystem.

FIG. 4 depicts a high-level flow chart of a method 200 for rapidly copying data on a RAID subsystem 20 in accordance with the present invention. FIG. 4 will be explained with reference to FIGS. 1 and 4. The data being copied can reside on a portion of a drive 30, 32, 34, or 36 in the RAID subsystem 20. The drive 30, 32, 34, or 36 from which data is being copied is the source drive. The drive 30, 32, 34, or 36 to which data is being copied is the target drive. In a preferred embodiment, the target drive may be any drive which is recognized by the system 10. The source drive is associated with the target drive, via step 202. Thus, the copy engine 110, consistency machine 120, and metadata 130 understand the location of the data being copied and the location to which data is being provided. The data on the source drive is then copied to the target drive while allowing input to and output from the source drive and, in a preferred embodiment, the target drive during copying, via step 204. In a preferred embodiment, step 204 includes copying the data on the source drive block by block. However, in an alternate embodiment, the data being copied could be segmented into any sized pieces for copying. In a preferred embodiment, the copy of the data provided in step 204 is the data as it existed at approximately the instant copying commenced. However, in an alternate embodiment, the copy could include some or all modifications made to the data during the copying procedure. Note that the copying step 204 may not take any less time than conventional copying using step 44 of the method 40 depicted in FIG. 2. Referring back to FIG. 4, however, the copying step 204 appears significantly faster to the server 12 and a user because access is allowed to the data being copied very rapidly. In a preferred embodiment, step 204 includes allowing access to the data being copied almost instantaneously after copying commences.

Figure 5:
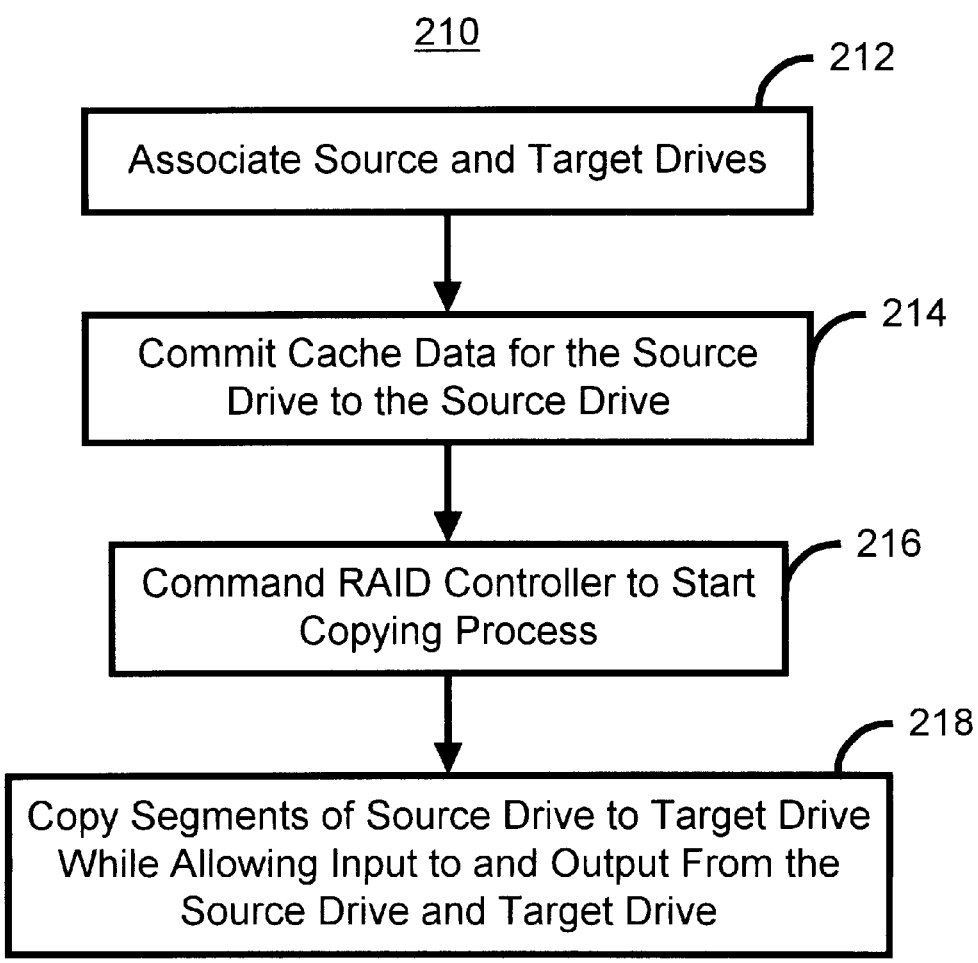
FIG. 5 is a more detailed flow chart of a method for rapidly providing a copy of data residing on a drive in a RAID subsystem.

FIG. 5 depicts a more detailed flow chart of a method 210 in accordance with the present invention for rapidly providing a copy of data in a system, such as the system 10, including a RAID subsystem 20. FIG. 5 will be explained with reference to FIG. 1 and FIG. 5. The source drive is associated with the target drive, via step 212. Step 212 is analogous to step 202. Thus, the source and target drives are defined and the RAID subsystem 20 is made aware of the source and target drives.

Cache data for the source drive is then committed to the source drive, via step 214. In a preferred embodiment, step 214 includes committing data in the cache 17 and data in the cache 26 that is to be stored on the source drive to the source drive. During step 214, there is no input to or output from the files to be copied from the source drive. Thus, in a preferred embodiment, step 214 includes temporarily closing the files on the source drive that include data being copied while cache data is committed. Once the cache data has been committed, the files can be reopened for use. Thus, in a preferred embodiment, step 214 includes opening the files that include data to be copied once the cache data has been committed to the source drive. Also in a preferred embodiment, step 214 is carried out using the operating system 13 on the server 12.

The RAID controller 21 is then commanded to commence the copying process, via step 216. In a preferred embodiment, step 216 includes providing a "create snapshot" command to the RAID controller 21. The data on the source drive is then copied to the target drive while allowing input to and output from the source drive and, in a preferred embodiment, the target drive during copying, via step 218. Step 218 is analogous to step 204 of the method 200. In a preferred embodiment, the copying step 218 is performed using the copy engine 110, the consistency machine 120, and the metadata 130 on the RAID controller 20.

Figure 6A:
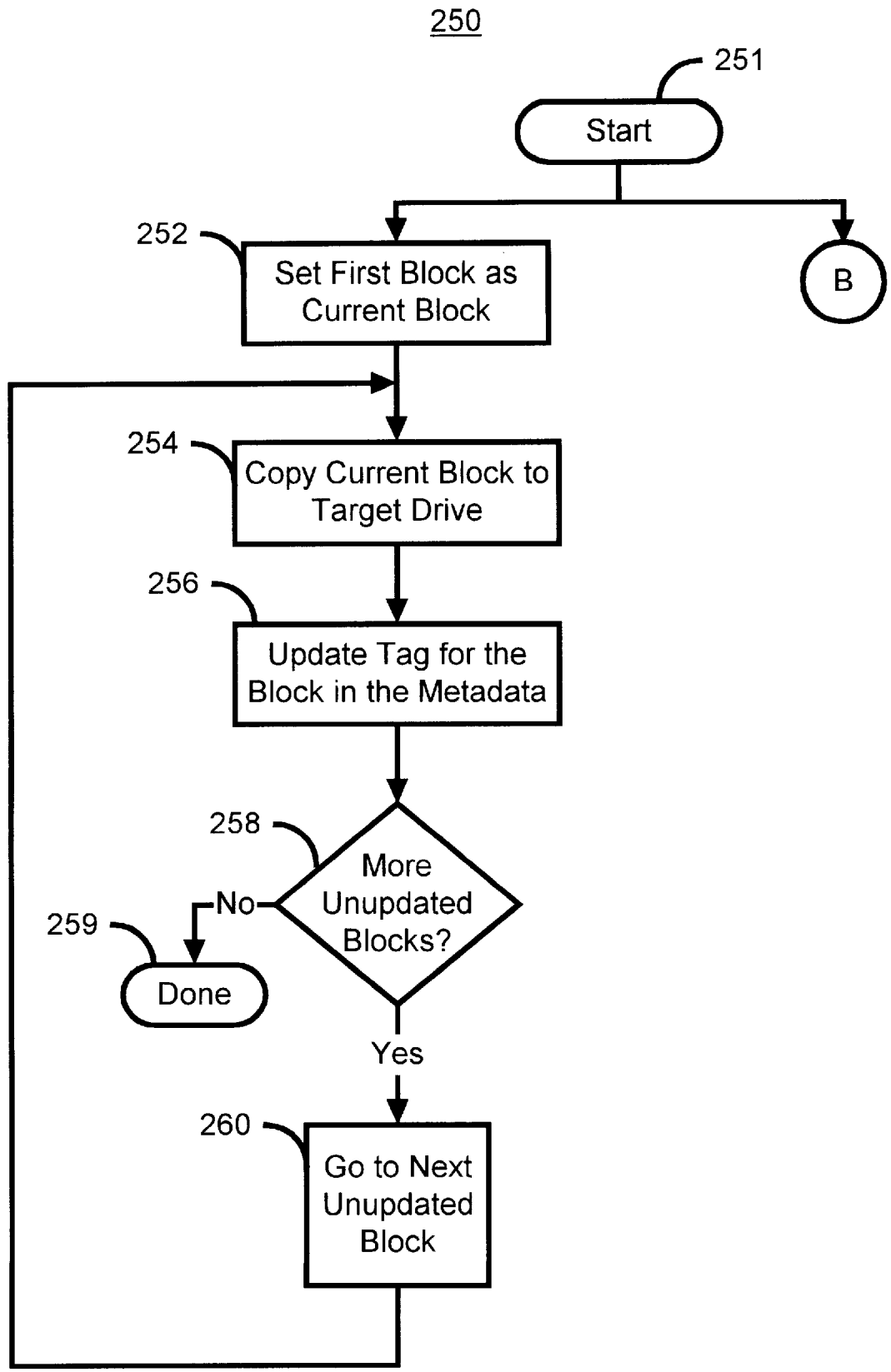
FIGS. 6A and 6B depict a more detailed flow chart of a preferred embodiment of a method for rapidly providing a copy of data residing on a drive in a RAID subsystem.
Figure 6B:
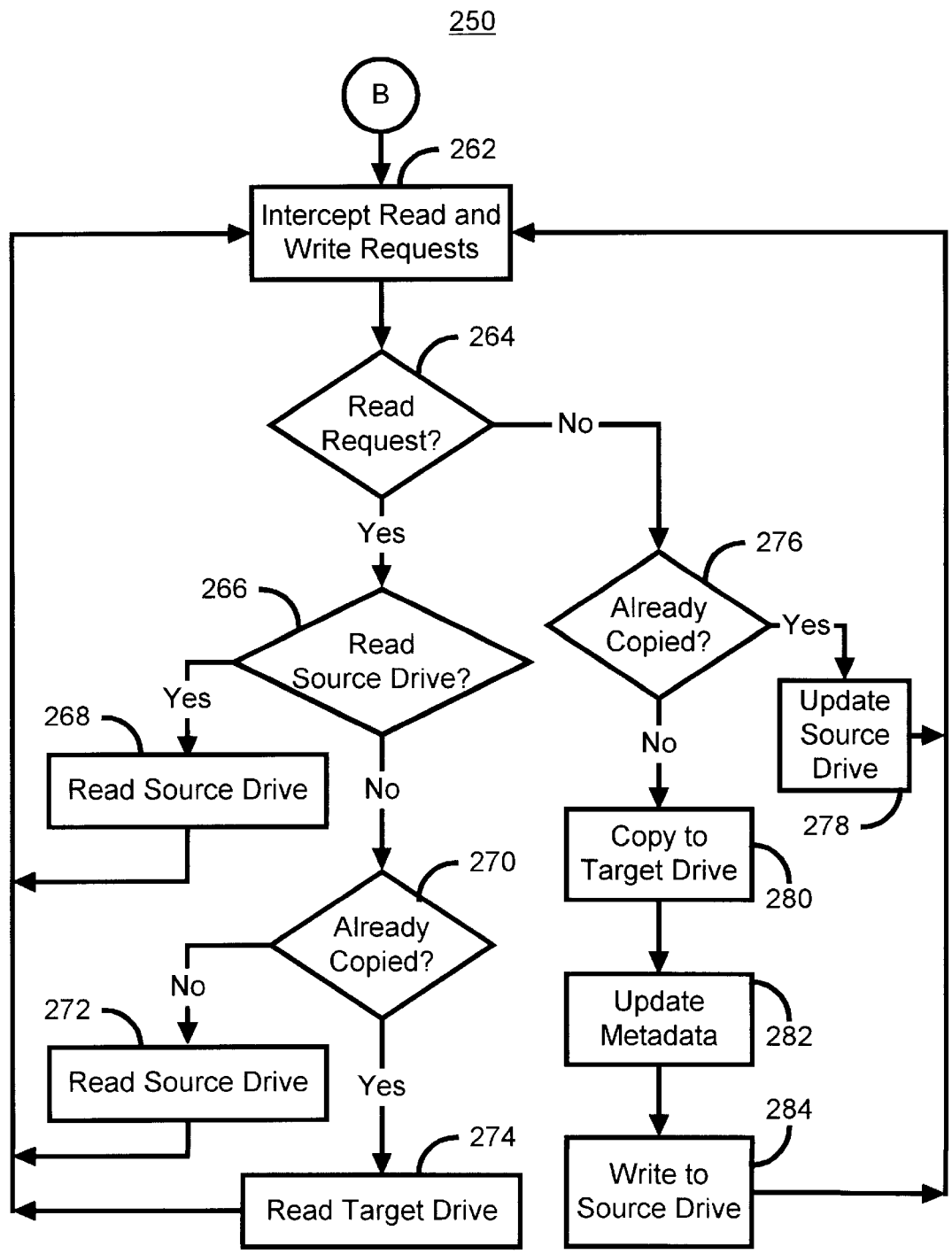

FIGS. 6A and 6B depicts a more detailed flowchart of a preferred embodiment of a method 250 for providing a copy of a portion of the source drive to the target drive while allowing input to and output from the source drive and, in a preferred embodiment, the target drive. Thus, the method 250 may be used to perform step 204 or 218 of the method 200 or 210, respectively, depicted in FIG. 4 or 5, respectively. Note that although the method 250 is described in terms of "blocks" of data, any segment of data can be used.

After the method 250 commences, at step 251, a first block is set as the current block, via step 252. This current block is copied from the source drive to the target drive, via step 254. Step 254 preferably includes copying the block such that the organization of data is also copied to the target drive. Thus, the copies of the directories, subdirectories, and files should appear to the user in the expected position on the target drive. A portion of the metadata 130 for that block is then updated, via step 256. Preferably, the metadata 130 includes a tag for each block that is to be copied. Thus, step 256 preferably includes updating the tag to indicate that the block has been copied. It is then determined if there are more blocks to copy, via step 258. If not, then copying terminates, via step 259. If, however, more blocks remain to be copied, then the next uncopied block is set as the current block, via step 260. Steps 254 through at least step 260 are thus repeated until the desired portion of the source drive is copied. Steps 254 through 260 are also preferably carried out by the copy engine 110 in the background. Thus, steps 254 through 260 are transparent to a user.

In addition to copying using steps 254 through 260, input to and output from the source and target drives are allowed. Thus, read or write requests for the source or target drives are intercepted, via step 262. In a preferred embodiment, the consistency machine 120 performs step 262. It is then determined whether the request is a read request, via step 264. If the request is a read request, then it is determined whether the block or blocks requested is to be read from the source drive, via step 266. If so, then the requested block(s) are read from the source drive, via step 268. If it is determined in step 266 that the read request is not for the source drive, then the read request is for the copy stored on the target drive. It is then determined if the requested block(s) have been copied to the target drive, via step 270. In a preferred embodiment, step 270 is performed by determining the state of the tags in the metadata 130 for the block(s) requested. If the block(s) have not yet been copied, the data still resides unchanged on the source drive. Thus, if the block(s) to be read have not been copied, then via step 272 the read request is diverted to the source drive. The block(s) are, therefore, read from the source drive. If it is determined in step 272 that the block(s) have been copied, then the data is read from the target drive, via step 274. After completion of the read in steps 268, 272, or 274, then the method 250 returns to step 262 to intercept the next request.

If it is determined in step 264 that the request is not a read request, then the request is a write request. Thus, the request is attempting to modify block(s) storing data on the source drive. It is determined whether the block(s) to be modified have been copied to the target drive, via step 276. If the block(s) have been copied, then the block(s) are simply modified, via step 278. This is because modification to block(s) which have already been copied may not adversely affect the copying procedure by changing the block(s). If, however, it is determined that the block(s) to be modified have not already been copied, then the block(s) are copied to the target drive, via step 280. The tag(s) in the metadata 130 for the block(s) are then updated to indicate that the block(s) have been copied, via step 282. The desired block (s) on the source drive may then be written to, via step 284. The method 250 then returns to step 262 to intercept additional read or write requests. Although not explicitly shown, if an error occurs during the method 250, then the method 250 terminates.

Figure 7A:
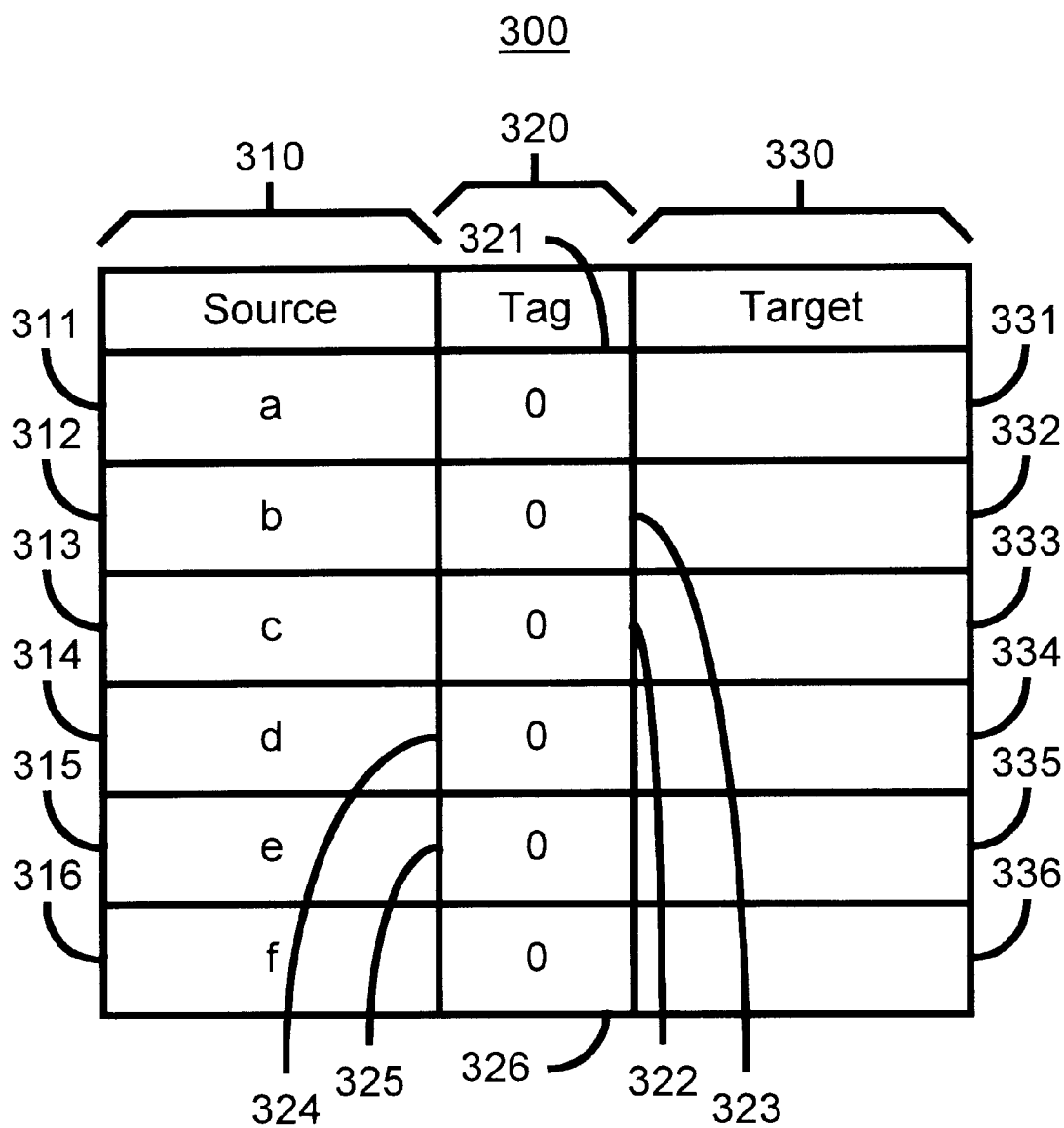
FIG. 7A is a block diagram of metadata for the source and target drives at the time the copy of the source drive is to be made.

FIGS. 7A through 7D depict the states of the metadata 130, source drive, and target drive during various times after copying has been initiated, for example in step 216 of the method 210. Referring now to FIG. 7A, the states 300 is depicted at time $t_o$, when the copying procedure has just been initiated. Thus, source 310 and target 330 drives have been defined. The metadata, or tags 320 for six blocks 311–316 to be copied, blocks holding data a, b, c, d, e, and f, have been determined. The tags 320 have also been determined. The tags 321 through 326 corresponding to blocks a 311 through f 316 have been set as zeroes. This is because none of the blocks 311–316 have been copied.

Figure 7B:
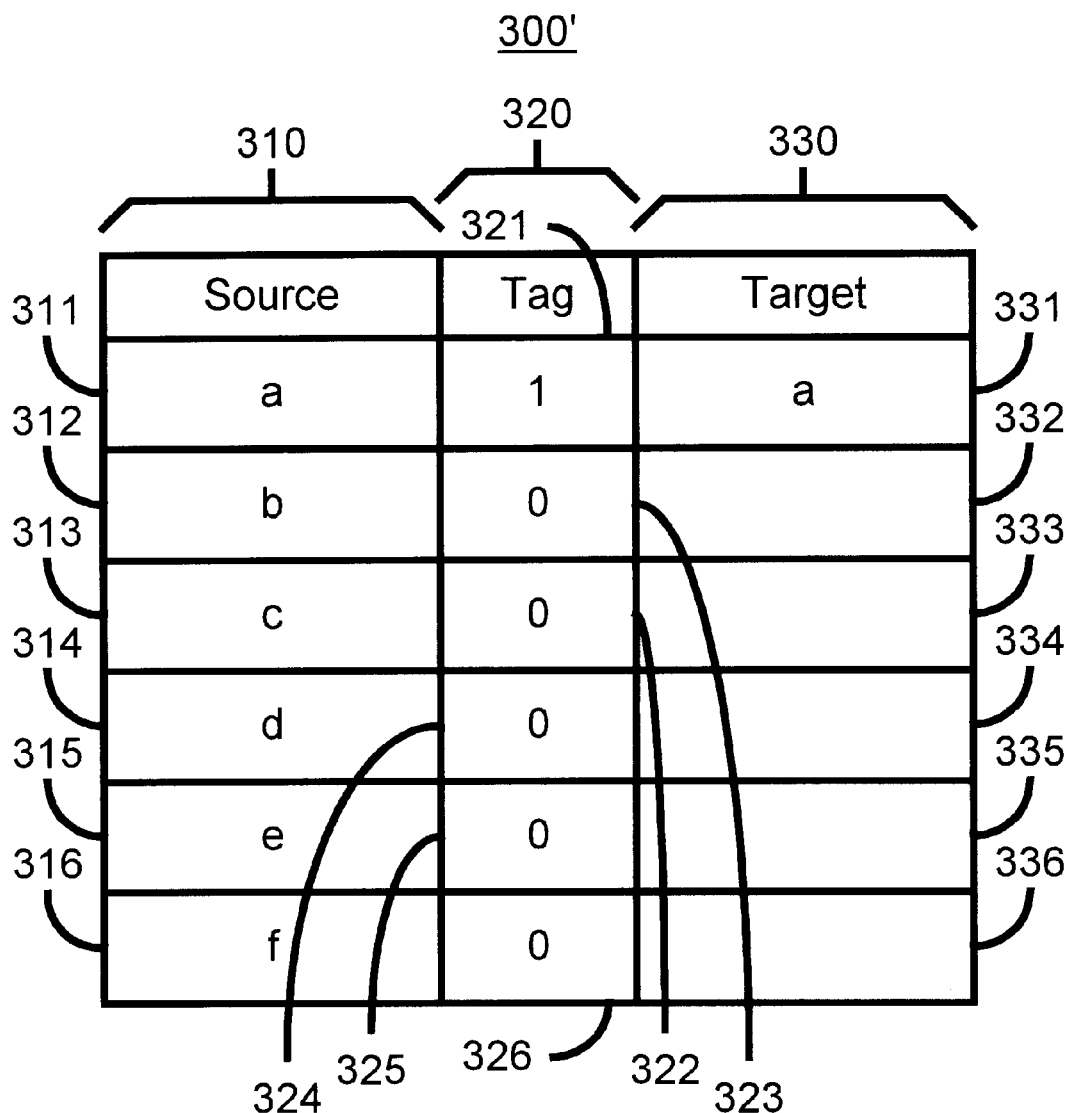
FIG. 7B is a block diagram of metadata for the source and target drives just after the copy of the first block on the source drive is made.

FIG. 7B depicts the state 300' of the source drive 310, tags 320, and target drive 330 at time $t_1$, when the first block 311 in the source drive 310 has been copied to the first block 331 in the target drive 330. Thus, the tag 321 for the first block 311 has been changed to a one. This change reflects the fact that the first block 311 has been copied. Because the remaining blocks 312 through 316 have not been copied, the corresponding tags 322 through 326 remain zeroes.

Figure 7C:
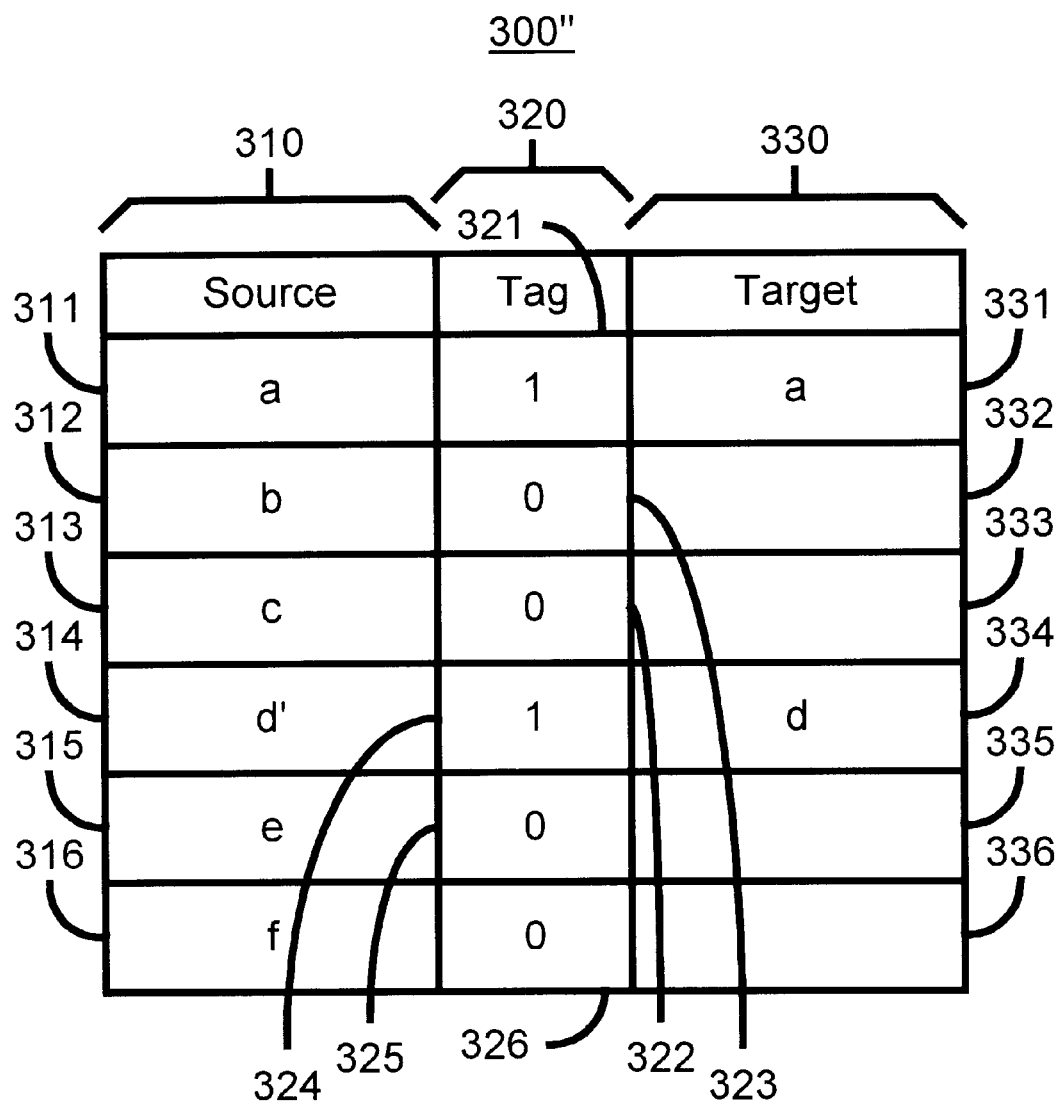
FIG. 7C is a block diagram of metadata for the source and target drives just after a file which had not been copied has been modified.

FIG. 7C depicts the state 300" of the source drive 310, tags 320, and target drive 330 at time $t_2 > t_1$ when a request to write to the fourth block 314 has been received and processed in accordance with the method 250. Because $t_2>t_1$, the first block 311 in the source drive 310 has been copied to the first block 331 in the target drive 330 and the corresponding tag 321 is a one. The fourth block 314 on the source drive 310 has been modified to hold data d' because of the write request. However, before data in the fourth block 314 was modified, the fourth block 314 was copied to the fourth block 334 on the target drive 330. Thus, the target drive 330 includes data d for the fourth block 334 prior to the modifications. In addition, the tag 324 for the fourth block 314 is changed to reflect that the fourth block 314 has been copied to the target drive 330. Thus, when copying of the source drive 310 continues, the fourth block 314 need not be recopied to the target drive 330. Instead, the second block 312, the third block 313, the fifth block 315, and sixth block 316 will be sequentially copied if there are no more intervening write requests.

Figure 7D:
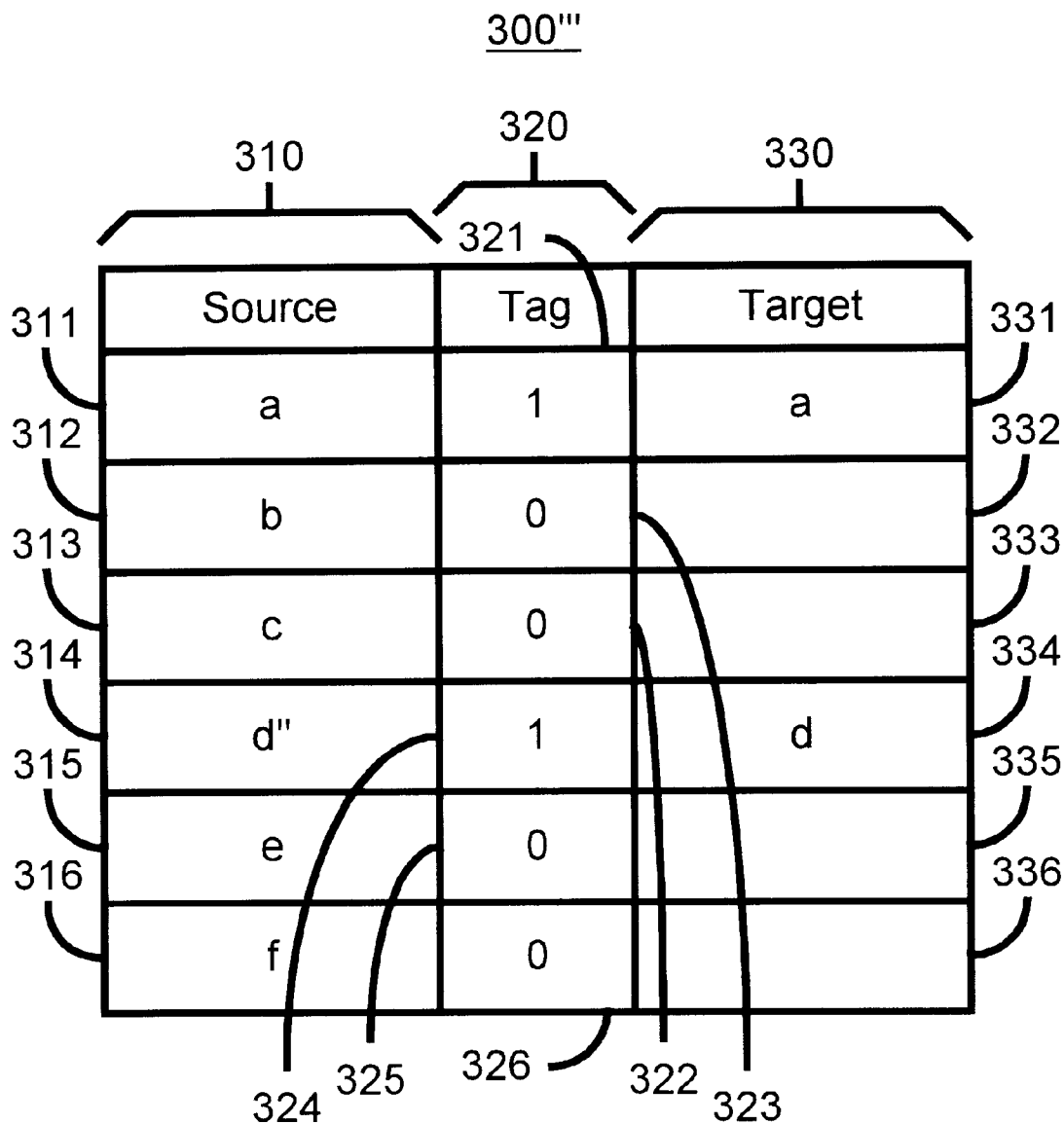
FIG. 7D is a block diagram of metadata for the source and target drives just after a file which had been copied has been modified.

FIG. 7D depicts the state 300''' of the source drive 310, tags 320, and target drive 330 at time $t_3>t_2$ when a second request to write to the fourth block 314 has been received and processed in accordance with the method 250. The fourth block 314 on the source drive 310 has been modified to hold data d" because of the write request. Because the tag 324 for the fourth block 314 indicated that the fourth block 314 had already been copied to the fourth block 334 of the target drive, the fourth block 314 is not recopied. The fourth block 314 is instead modified to hold data d". Block 334 of the target drive 330 still includes data d for the fourth block 314 prior to any modifications. Thus, the tags 320 in the metadata 130 track changes in the data. The copy engine 110 and consistency machine 120 ensure that a copy of the desired portion of the source drive 310 at the desired time is provided to the target drive 330 and ensure that input to and output from the desired locations can be provided during copying.

Using the system 10 and the method 200, 210, or 250, a copy of some or all of the source drive can appear to be provided substantially instantaneously. The only time during which input and output may not be provided to or from the source drive is while cache data is committed to the source drive, via step 214 of the method 210. Otherwise, data can be read from the source drive or the target drive while copying is provided in the background. Furthermore, input to the source and target drives may be allowed. In a preferred embodiment, it is ensured that portions of the source drive to be modified are first copied to the target drive. Thus, the copy on the target drive preserves the image of the source drive at substantially the instant that the copy was requested. However, in an alternate embodiment, updates to the source drive during copying may be reflected on the copy provided to the target drive. In either embodiment, the metadata 130 can be used to keep track of changes made during copying. Thus, the RAID controller 21 tracks changes to the data and, using the consistency machine 120, ensures that the data on the source drive and the copy on the target drive are consistent with what is expected. Furthermore, although steps 254 through 260 are described as being provided for all blocks to be copied, only a portion of the blocks on the source drive may be copied. For example, steps 276 through 284 can be used to copy only those blocks which will change during a particular period of time.

Thus, a copy of the desired portion of the source drive can be provided rapidly. In other words, the server 12 and users can both the access copy and modify the data in the source drive almost immediately. This is true even though the copy may not be completed. Thus, the present invention finds particular utility in systems in which a copy of a large file is desired. Because input and output are allowed and consistency managed during copying, the file need not be closed for the entire time the copy is being provided. Instead, the file may be inaccessible only for a short time, while data in the cache 17 and the cache 26 is committed to the source drive. After this time, the users can modify the data on the source drive as well as access the copy on the target drive. Thus, users are not denied access to data for a relatively long period of time.

A method and system has been disclosed for rapidly providing a copy of data on a RAID subsystem. In a preferred embodiment, the copy is provided relatively instantaneously. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a copy of a portion of a source drive of a plurality of drives in a redundant array of inexpensive disks (RAID) data storage system, the portion of the source drive including a plurality of segments, the method comprising the steps of:

(a) associating the source drive with a target drive of the plurality of drives; and (b) providing the copy of the plurality of segments on the target drive;

wherein input to and output from the source drive and the target drive are allowed during the step of providing the copy of the plurality of segments.

2. The method of claim 1 wherein the copying step (b) further includes the steps of:

(b1) indicating whether each of the plurality of segments has been copied since the step of providing the copy commenced; and (b2) tracking modifications to each of the plurality of segments since the step of providing the copy commenced.

3. The method of claim 2 wherein the indicating step (b1) further includes the step of:

(b1i) providing metadata associated with each of the plurality of segments, the metadata indicating whether a copy of the segment has been provided to the target drive.

4. The method of claim 1 wherein the copying step (b) further includes the steps of:

(b1) providing a segment of the plurality of segments from the source drive if the segment is requested for reading and it is indicated that a copy of the segment has not been provided on the target drive, (b2) providing the segment from the source drive if the segment is requested for reading and modifications have not been made to the segment since the step of providing the copy commenced, (b3) providing the segment from the source drive if the segment is requested for reading, the modifications have been made to the segment since the step of providing the copy commenced, and the modifications are desired;

(b4) providing the copy of the segment of the plurality of segments from the target drive if the segment is requested for reading, modifications have been made to the segment since the step of providing the copy commenced, and the modifications are not desired.

5. The method of claim 1 wherein the copying step (b) further includes the steps of:

(b1) if modifications are to be made to a segment of the plurality of segments from the source drive and a copy of the segment has not been providing yet, providing the copy of a segment to the target drive, indicating that the copy of the segment has been provided, and making the modifications to the segment in the source drive; and (b2) if the modifications are to be made to a segment from the source drive and the copy of the segment has been provided, making the modifications to the segment in the source drive.

6. The method of claim 5 wherein the copying step (b) further includes the steps of:

(b3) providing the segment from the source drive if the segment is requested for reading and it is indicated that the copy of the segment has not been provided on the target drive, (b4) providing the segment from the source drive if the segment is requested for reading and modifications have not been made to the segment since the step of providing the copy commenced, (b5) providing the segment from the source drive if the segment is requested for reading, the modifications have been made to the segment since the step of providing the copy commenced, and the modifications are desired;

(b6) providing the copy of the segment of the plurality of segments from the target drive if the segment is requested for reading, modifications have been made to the segment since the step of providing the copy commenced, and the modifications are not desired.

7. The method of claim 1 wherein the RAID data storage system further includes a cache coupled with the plurality of disks, the cache capable of including data to be provided to the portion of the source drive, and wherein the method further includes the step of:

(c) committing the data in the cache to the source drive prior to commencing the step (b) of providing the copy to the target drive.

8. A system for providing a copy of a portion of a source drive of a plurality of drives in a redundant array of inexpensive disks (RAID) data storage system, the portion of the source drive including a plurality of segments, the system comprising:

a target drive associated with the source drive, the target drive for storing a copy of the plurality of segments;

a copy engine coupled with the source drive and the target drive for providing the copy of the plurality of segments on the target drive; and metadata coupled with the copy engine including an indication of whether the copy of the plurality of segments has been provided to the target drive;

wherein input to and output from the source drive and the target drive are allowed while the copy engine provides the copy of the plurality of segments to the target drive.

9. The system of claim 8 wherein the metadata further includes a plurality of entries corresponding to the plurality of segments, each entry indicating whether a corresponding segment has been copied to the target drive.

10. The system of claim 8 further comprising:

a consistency machine coupled with the source drive and the target drive, the consistency machine for intercepting a write request for modifications to be made to a segment of the plurality of segments, in response to the write request, the consistency machine further for providing a copy of the segment on the target drive if the copy has not been provided yet, indicating that the copy of the segment has been provided if the copy has not been providing yet, and making the modifications to the segment in the source drive after the copy has been provided.

11. The system of claim 10 wherein in response to the request, the consistency machine makes the modifications to the segment in the source drive in response to the request if the copy of the segment has been provided.

12. The system of claim 11 wherein the consistency machine is further for intercepting a read request for the segment and in response to the read request, providing the segment from the source drive if it is indicated that a copy of the segment has not been provided on the target drive, providing the segment from the source drive if the modifications have not been made to the segment since the step of providing the copy commenced, providing the segment from the source drive if the modifications have been made to the segment since the step of providing the copy commenced and the modifications are desired, and providing the copy of the segment from the target drive if modifications have been made to the segment since the copy was provided and the modifications are not desired.

* * * * *